(12) United States Patent
Kageyama et al.

(10) Patent No.: US 7,586,404 B2
(45) Date of Patent: Sep. 8, 2009

(54) DISPLAY APPARATUS

(75) Inventors: Hideaki Kageyama, Shizuoka (JP);
Yoshiyuki Furuya, Shizuoka (JP);
Hiroyuki Yokota, Shizuoka (JP);
Satoshi Saotome, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 593 days.

(21) Appl. No.: 11/494,554

(22) Filed: Jul. 28, 2006

(65) Prior Publication Data
US 2007/0040072 A1    Feb. 22, 2007

(30) Foreign Application Priority Data
Aug. 4, 2005    (JP) .............................. 2005-227098

(51) Int. Cl.
*G09F 9/00*    (2006.01)
(52) U.S. Cl. .................. 340/461; 340/438; 248/27.1; 345/37
(58) Field of Classification Search ............. 340/461, 340/438, 439, 995.26, 995.1, 462; 248/27.1; 180/90; 296/70, 208; 345/37, 1.1
See application file for complete search history.

(56) References Cited

U.S. PATENT DOCUMENTS

| | | | | |
|---|---|---|---|---|
| 7,236,089 | B2* | 6/2007 | Ono et al. ................... | 340/461 |
| 7,369,044 | B2* | 5/2008 | Ono et al. ................... | 340/461 |
| 7,382,234 | B2* | 6/2008 | Yokota et al. ............. | 340/425.5 |
| 7,382,237 | B2* | 6/2008 | Stoschek et al. ........... | 340/438 |
| 2004/0046713 | A1* | 3/2004 | Tanaka et al. ................ | 345/33 |
| 2006/0202993 | A1* | 9/2006 | Birman et al. .............. | 345/426 |

FOREIGN PATENT DOCUMENTS

| | | |
|---|---|---|
| JP | 62-58112 | 3/1987 |
| JP | 11-248490 | 9/1999 |

* cited by examiner

*Primary Examiner*—Eric M Blount
(74) *Attorney, Agent, or Firm*—Kratz, Quintos & Hanson, LLP

(57) ABSTRACT

Providing a display apparatus with a structure suitable to support a ring-shaped member for three-dimensional effect to express information for recognition of a partial area of a display area of a display unit by surrounding the partial area with the ring-shaped member arranged in front of the display area so as to be movable linearly along the display area, the ring-shaped member is supported at the top side and the bottom side of the rear edge in a top-bottom direction along the display area and perpendicular to a direction of the linear motion, by each mount piece of the supporting member. Front portions of the mount pieces located in front of the display area are completely covered by the facing plate located between the front portions and the front large diameter portion of the ring-shaped member.

2 Claims, 5 Drawing Sheets

DISPLAY APPARATUS

The priority application Number Japan Patent Application 2005-227098 upon which this patent application is based is hereby incorporated by reference.

BACKGROUND OF THE INVENTION

1. Field of the Invention

This invention relates to a display apparatus, using a display device such as a liquid crystal display, an organic electroluminescence display and a plasma display.

2. Description of the Related Art

As a combination meter for displaying various information of a vehicle, a display apparatus to express information, which was expressed in an analogue meter, in digital form in a liquid display and the like exists (for example cited patent documents 1 and 2). In such display apparatus, displayed information in the liquid display is only switched properly, but it has lack of impact and variety on displaying since the displaying is flat.

This applicant proposed a display apparatus for a vehicle, which surrounded a partial area of a display area of a liquid display with a partitioning member arranged in front of the display area of the liquid display to be movable linearly along the display area, and thereby made recognition of the partial area in a view from a front side of the display area, in Japan Patent Application No. 2004-318862. The cited patent documents 1 and 2 are Published Patent Application No. S62-58112 and Published Patent Application No. H11-248490.

SUMMARY OF THE INVENTION

Objects to be Solved

When the aforesaid partitioning member is arranged in front of the display area of the liquid display to be movable linearly along the display area, it is important to prevent rattling motion of the moving partitioning member and important for enhancing three-dimensional effect to express information with impact and variety on the display how a supporting member required to connect an actuating device and the partitioning member can be hidden from a view area, and the partitioning member can be shown to rise from the liquid display.

To overcome the above problems, an object of this invention is to provide a display apparatus for a vehicle, which has a structure to make recognition of a partial area of a display area in a view from a front side of a display area by surrounding the partial area with a ring-shaped member (partitioning member) arranged in front of the display area so as to be movable linearly along the display area of a display unit, such as a liquid crystal display, an organic electroluminescence display, a plasma display and the like, and a supporting member suitable to support the ring-shaped member required for three-dimensional effect to express information with impact and variety.

How to Attain the Object of the Present Invention

In order to attain the object of the present invention, a display apparatus includes a display unit having a display area and a facing plate covering an outside area of the display area; a ring-shaped member arranged in front of the display area so as to be movable linearly along the display area, and surrounding a partial area of the display area for making recognition of the partial area in a view from a front side of the display area; an actuating device provided at a rear side of the display unit for moving the ring-shaped member; and a supporting member for connecting the actuating device and two partial portions of the ring-shaped member spaced from each other in a direction along the display area and intersecting a linear moving direction of the ring-shaped member, and the supporting member extends from the partial portions of the ring-shaped member toward an outer side of the ring-shaped member through an outside of the display unit until the actuating device, and the facing plate includes an opening for exposing the display area, and a circumferential edge of the opening is arranged between the partial portions of the ring-shaped member and the supporting member along a front-rear direction of the display unit.

The display apparatus is further characterized in the display apparatus mentioned above in that the display area displays various information of a vehicle, and a display design part for indicating measured values of driving condition of the vehicle from among the various information is surrounded as the partial area with the ring-shaped member.

According to the aforesaid display apparatus, the ring-shaped member is supported by the supporting member at two partial portions of the ring-shaped member, arranged with the space in the direction along the display area and perpendicular to the linear moving direction of the ring-shaped member, so as to be movable linearly. Thereby, rattling motion of the ring-shaped member in the direction perpendicular to the linear moving direction of the ring-shaped member can be prevented.

A portion of the supporting member, which is located in front of the display area of the display unit, is completely covered by the circumferential edge of the opening of the facing plate arranged between the two partial portions of the ring-shaped member connected to the supporting member and the supporting member. Thereby, it can be prevented that the supporting member required for preventing rattling motion of the moving ring-shaped member is exposed and seen when it is viewed from the front of the display unit, and three-dimensional expression of information with impact and variety can be realized securely by the display unit and the ring-shaped member.

According to the display apparatus mentioned above, the flat expression on the display unit without impact and variety, especially expression of measuring values in driving condition of the vehicle, can be changed to the three-dimensional expression by displaying the various information of the vehicle with free expression on the display unit.

The above and other objects and features of this invention will become more apparent from the following description taken in conjunction with the accompanying drawings.

DESCRIPTION OF THE PREFERRED EMBODIMENT

An embodiment according to the present invention will be described with reference to figures.

Figure 1:
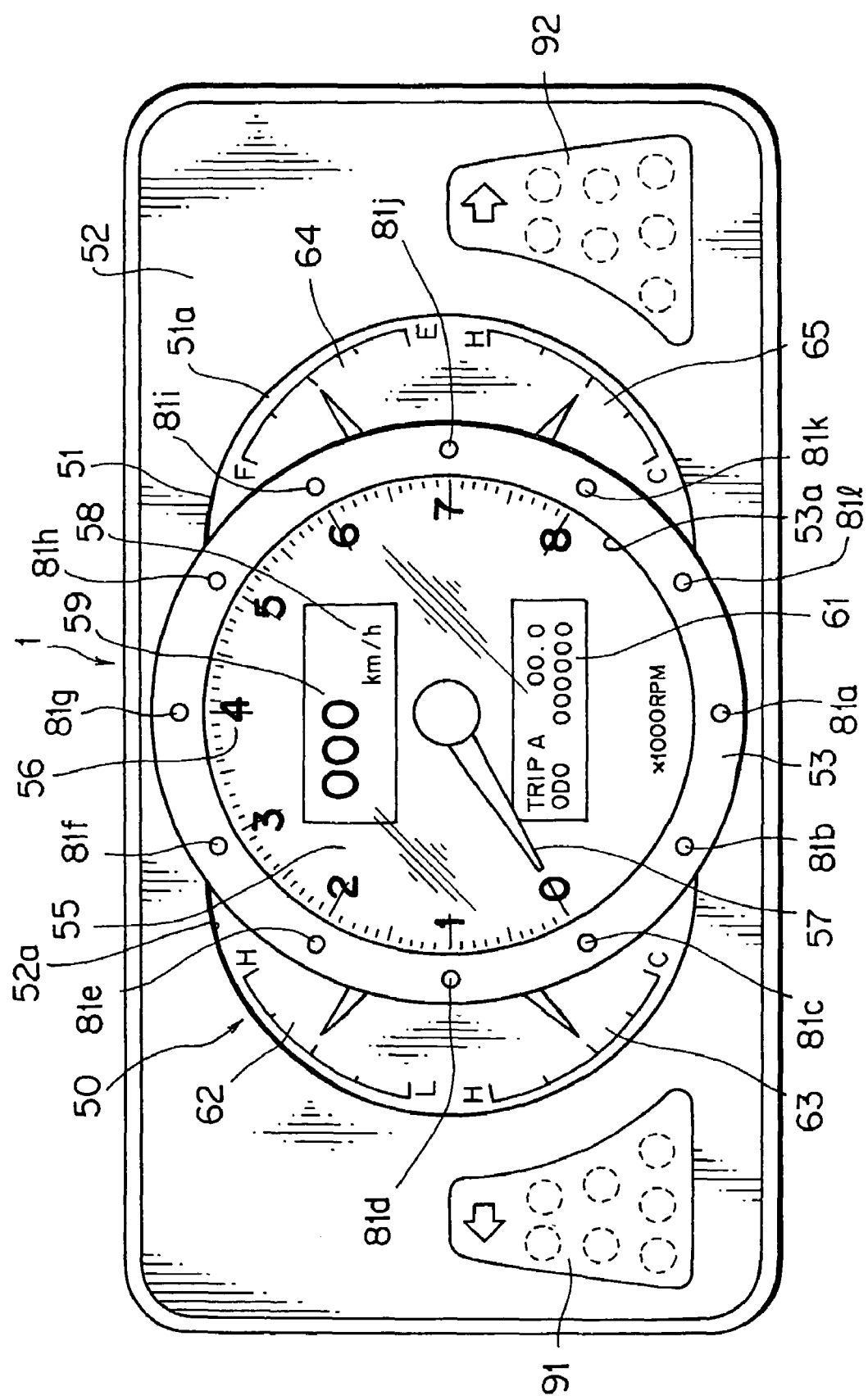
FIG. 1 is a front view of an embodiment of a display apparatus for a vehicle according to the present invention.
Figure 2:
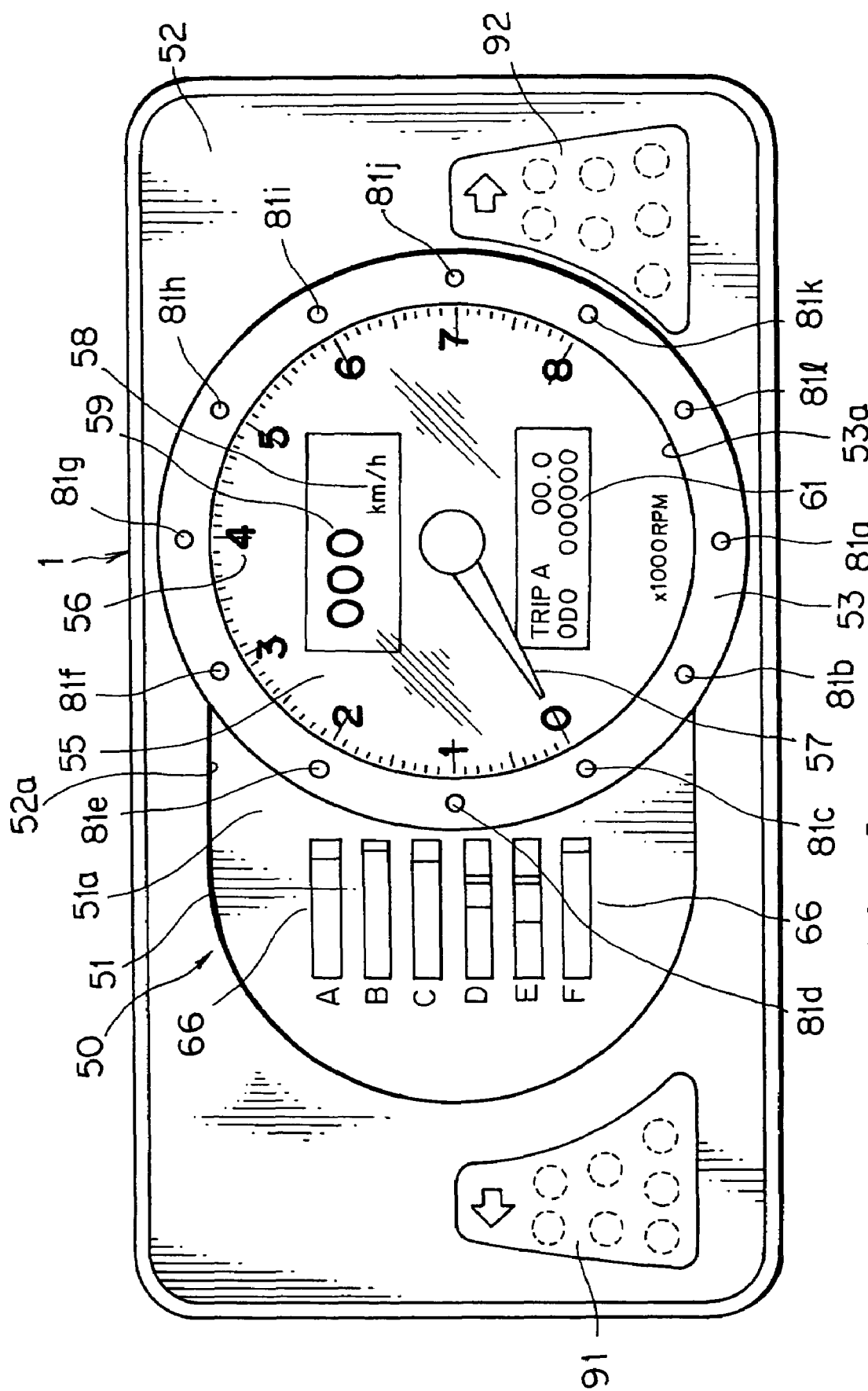
FIG. 2 is a front view of the display apparatus shown in FIG. 1 after a ring-shaped member is moved.
Figure 3:
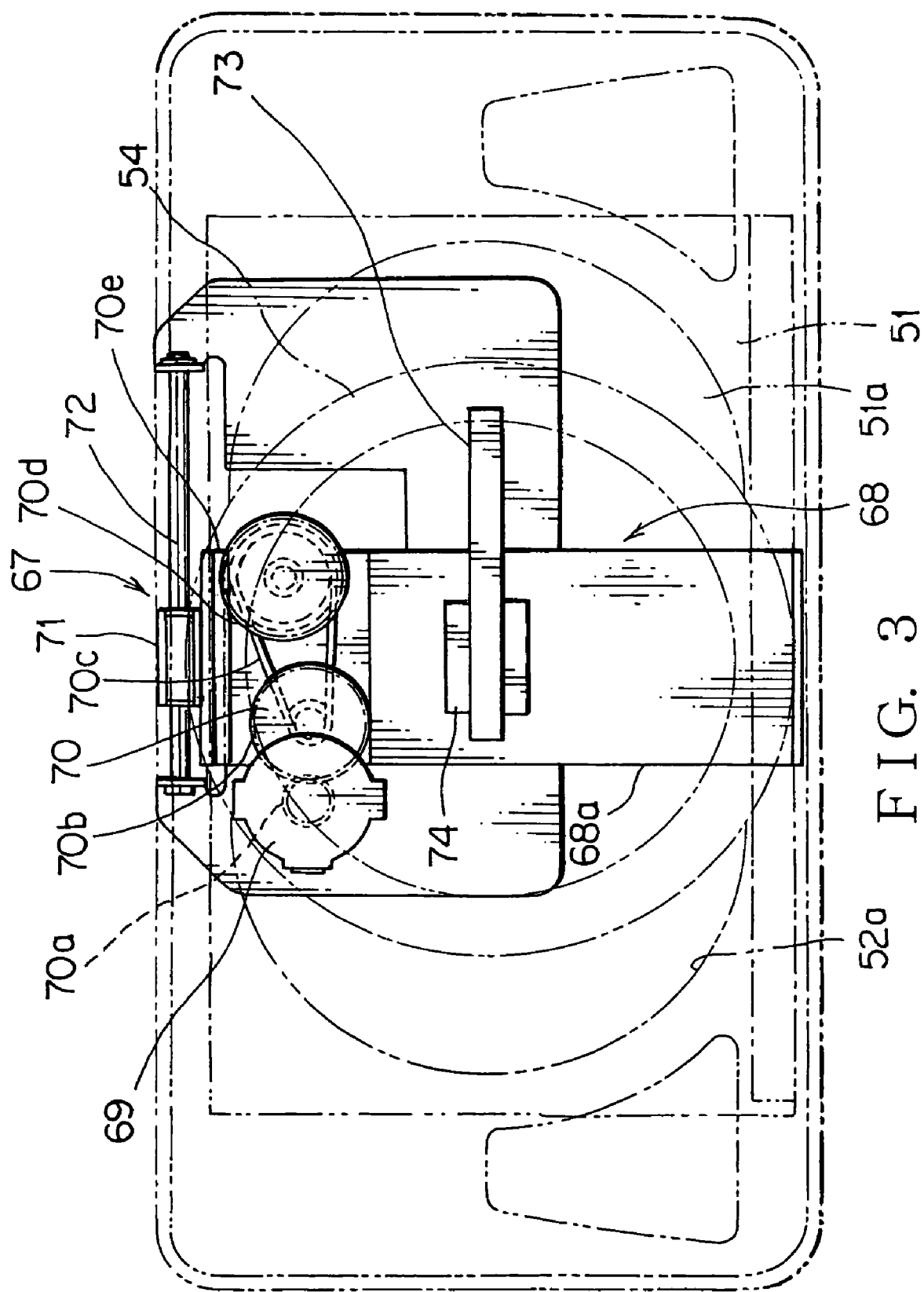
FIG. 3 is a see-through front view of the display apparatus shown in FIG. 1, for describing a motion mechanism.
Figure 4:
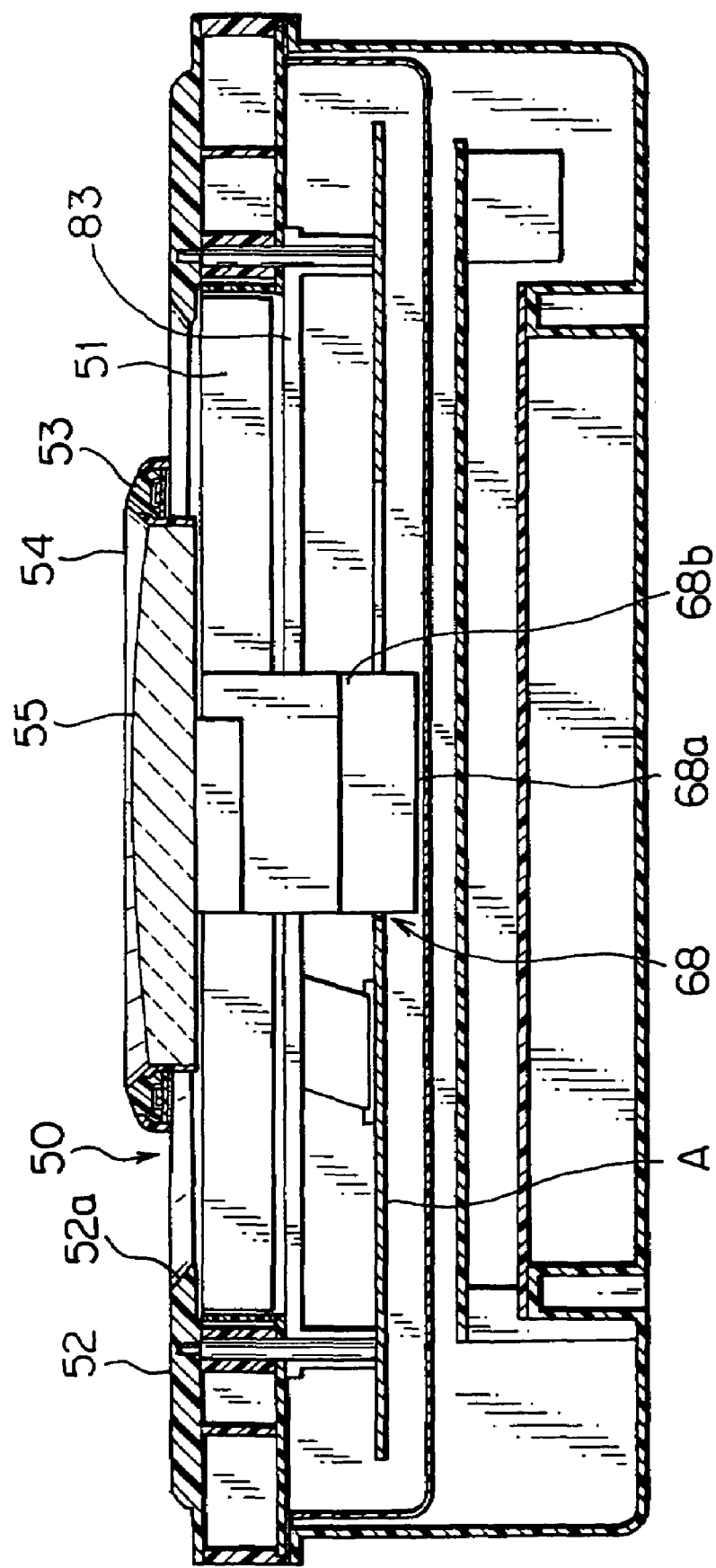
FIG. 4 is a sectional bottom view of the display apparatus shown in FIG. 1, for describing a motion mechanism.
Figure 5:
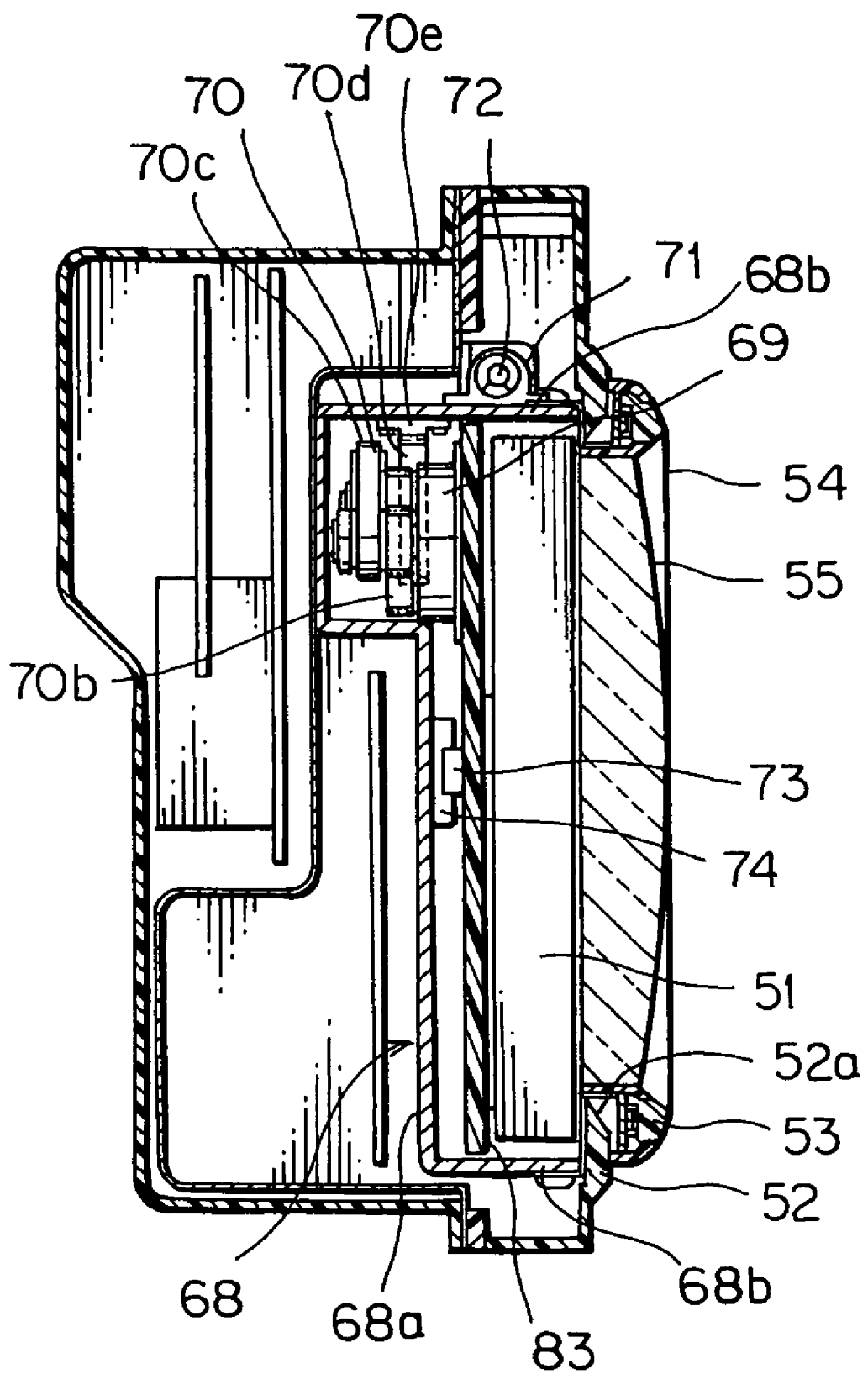
FIG. 5 is a sectional left side view of the display apparatus shown in FIG. 1, for describing a motion mechanism.

FIGS. 1, 2 are front view of an embodiment of a display apparatus for a vehicle according to the present invention. FIG. 3 is a see-through view showing an internal structure thereof. FIG. 4 is a sectional bottom view of the display apparatus shown in FIG. 3. FIG. 5 is a sectional left side view of the display apparatus shown in FIG. 3.

In FIG. 1, a full-graphic meter 50 is arranged in a front center of a display apparatus 1 for a vehicle. Warning indicators 91, 92 are arranged respectively on the right side and the left side of the full-graphic meter 50.

The full-graphic meter 50 includes a liquid crystal display 51 (call LCD hereafter, corresponds to a display unit), a facing plate 52 covering a partial area of the LCD 51, and a ring-shaped member 53 arranged in front of the LCD 51 and the facing plate 52. The LCD 51 has a display area 51a exposed through an oval opening 52a of the facing plate 52. In the display area 51a, various information showing driving conditions of the vehicle can be displayed.

The ring-shaped member 53 is located substantially in the center of the display area 51a. The ring-shaped member 53 is formed with opaque plastic material. A lens 55 is fitted into a round opening 53a formed in the center of the ring-shaped member 53. The lens 55 is a concave lens herein, but can be either of convex-type and concave-type. The ring-shaped member 53 is provided at substantially regular intervals with twelve LED light-emitting portions 81a-81l.

An area of the display area of the LCD 51, which is surrounded with the opening 53a of the ring-shaped member 53, is defined as a first display area to be a partial portion of whole displaying area of the display area 51a of the LCD 51 excluding an area hidden by the facing plate 52. A display design part 56 corresponding to a round dial plate showing measuring values in a driving condition of a vehicle is expressed in the area of the display area of the LCD 51.

The display design part 56 is a tachometer for indicating an engine rotational speed as a first datum of vehicle information, and a scale for the tachometer is displayed in an outer circle area of the display design part 56. A pointer 57 for indicating the scale for the tachometer by rotating corresponding to the measuring value of the engine rotational speed is expressed in the area. The display design part 56 and the pointer 57 form an analogue indicated measuring meter.

In a central area of the display design part 56, a display subarea 58 for displaying information of other than the tachometer is arranged. The display subarea includes a speed meter display area 59 for expressing a speed meter indicating a vehicle driving speed in digital and an odometer/tripmeter display area 61 for expressing an odometer/tripmeter indicating a vehicle travel distance in digital.

In the display area 51a of the LCD 51 surrounded with a left side of an outer edge of the ring-shaped member 53 and the facing plate 52, an oil-pressure meter display area 62 for expressing an oil-pressure meter indicating oil pressure of an engine oil and an oil-temperature meter display area 63 for expressing an oil-temperature meter indicating oil temperature of the engine oil are provided.

In the display area 51a of the LCD 51 surrounded with a right side of the outer edge of the ring-shaped member 53 and the facing plate 52, a fuel meter display area 64 for expressing a fuel meter indicating remained amount of fuel such as gasoline and a water-temperature meter display area 65 for expressing a water-temperature meter indicating cooling water temperature are provided.

In the embodiment, the display design part 56, the pointer 57 and the speed meter display area 59 and the odometer/tripmeter display area 61 of the display subarea 58 in the display area 51a of the LCD 51 correspond to the partial area of the display area.

In the display apparatus 1 for a vehicle, the ring-shaped member 53 can move in a direction of a major axis of the oval display area 51a of the LCD 51.

FIG. 2 shows a condition that the ring-shaped member 53 moved from the substantial center of oval display area 51a of the LCD 51 to a right end thereof. In correspondence with motion of the ring-shaped member 53, expression of the display design part 56 is moved from the center of the display area to the right end, and the display design part 56 surrounded with the ring-shaped member 53 is expressed when the ring-shaped member 53 stops.

When the ring-shaped member 53 and expression of the display design part 56 start to move, expressions of the oil-pressure meter display area 62 and the oil-temperature meter display area 63 expressed on the left side of the display area 51a of the LCD 51 and the fuel meter display area 64 and the water-temperature meter display area 65 expressed on the right side of the display area 51a are erased simultaneously. After the ring-shaped member 53 and expression of the display design part 56 finished to move, information of the vehicle other than information expressed on each aforesaid display area is expressed on an expanded display area from the center to the left end. For example, in FIG. 2, a remained amount of engine oil (OIL LEVEL), a remained amount of brake fluid (BRAKE FLUID) a remained amount of cooling water (COOLANT), an exhaust temperature (EXH-TEMP), an intake temperature (INT-TEMP) and a remained amount of washer fluid (WASHER) are expressed thereon.

A structure of a motion mechanism 67 for moving the ring-shaped member 53 will be described herein. FIGS. 3-5 are respectively a front see-through view, a sectional bottom view and a sectional right side view of the display apparatus for a vehicle for describing the motion mechanism 67. The motion mechanism 67 includes a motor 69 as an actuating device for the ring-shaped member 53 and a supporting member 68 connecting (linking to drive) the motor 69 and the ring-shaped member 53, as shown in FIG. 5.

The supporting member 68 has a base portion 68a provided at a rear side of a base board 83, on which the LCD 51 is mounted, and extending in a direction from a top to a bottom of the LCD 51 as shown in FIGS. 3, 5, and a pair of mount pieces 68b extending from a top end and a bottom end of the base portion 68a toward the front of the LCD 51 as shown in FIG. 4. Each top end of the pair of mount pieces 68b is bent along a rear wall of the facing plate 52 toward an inside of the opening 52a as shown in FIG. 5. Each top end of the pair of mount pieces 68b is fixed to a top side and a bottom side of a rear edge of a rear small diameter portion of the ring-shaped member 53, which is inserted into the opening 52a of the facing plate 52. The motor 69 is mounted on the base board 83.

Thereby, an area near the opening 52a of the facing plate 52 is located between front portions of each mount piece 68b of the supporting member 68 and a front large diameter portion of the ring-shaped member 53, which is not inserted into the opening 52a of the facing plate 52 and is positioned in front of the facing plate 52. Thus, the front portions of mount pieces 68b located in front of the display area 51a of the LCD 51 are completely covered by the facing plate 52.

The motion mechanism 67 includes the supporting member 68, the motor 69 and an additional transmission device 70 for transmitting driving force of the motor 69 to the supporting member 68. The transmission device 70 includes a shaft 72 arranged and fixed along the direction of moving the ring-shaped member 53 above the LCD 51 and extending along a top edge of the opening 52a of the facing plate 52, a first supporting member 71 fixed on the top-side mount piece 68b of the supporting member 68 and fitted slidably with the shaft 72, a rail member 73 arranged in parallel to the major axis of the oval display area 51a at a rear side of the base board 83, and a second supporting member 74 fixed on the supporting member 68 and formed with a guide groove for guiding the rail member 73.

The transmission device 70 further includes a gear 70a fixed on a rotating shaft of the motor 69, a gear 70b engaging with the gear 70a, a pinion 70d rotated through a belt 70c by the gear 70b, and a rack 70e fixed on the top-side mount piece 68b of the supporting member 68 for converting rotational motion of the pinion 70d to linear motion in parallel to the major axis.

When the motor 69 is acted, since the linear motion converted by the rack 70e is transmitted, the top-side mount piece 68b of the supporting member 68 moves linearly along the top edge of the opening 52a of the facing plate 52 to be guided by the first supporting member 71 and the shaft 72. Thereby, the ring-shaped member 53 connected with the top-side mount piece 68b and the bottom-side mount piece 68b is moved linearly along the top edge of the opening 52a of the facing plate 52 in a direction corresponding to a rotating direction of the motor 69.

Expression on the LCD 51 and motion of the motor 69 for moving the ring-shaped member 53 with linkage to the expression are controlled by a microcomputer (not shown).

The ring-shaped member 53 is located at a position to always surround a main image of the display design part 56 showing an engine rotational speed on the display area 51a of the LCD 51 by the microcomputer (not shown).

Even if the motion of the ring-shaped member 53 during moving is stopped by any malfunctions of the motion mechanism 67, a position of the ring-shaped member 53 and positions of the display design part 56 and the pointer 57 are not displaced and the ring-shaped member 53 always surrounds the main image of the display design part 56 showing an engine rotational speed. Thereby, the main image can be recognized by distinguishing from the other image on the other area.

According to the display apparatus 1 for a vehicle of the embodiment structured above, the ring-shaped member 53 is supported at the top side and the bottom side of the rear edge with an interval in a top-bottom direction along the display area 51a of the LCD 51, perpendicular to a right-left direction as a direction of the linear motion, by each mount piece 68b of the supporting member 68 so as to be movable linearly in the right-left direction. Thereby, the ring-shaped member 53 is prevented from rattling in the direction perpendicular to the right-left direction as the direction of linear motion of the ring-shaped member 53.

The front portions of mount pieces 68b located in front of the display area 51a of the LCD 51 are completely covered by the area near the opening 52a of the facing plate 52 located between front portions of each mount piece 68b of the supporting member 68 and the front large diameter portion of the ring-shaped member 53. Thereby, when the full-graphic meter 50 is watched from a front side of the display apparatus 1, it is prevented that the supporting member 68 required for preventing from rattling of the ring-shaped member 53 during motion is exposed and seen. Thus, three-dimensional display with impact and variety can be realized by the LCD 51 and the ring-shaped member 53.

In the aforesaid embodiment, the motor 69 as the actuating device is fixed on the base board 83 and the rack 70e is fixed on the supporting member 68. Instead of that, the motor 69 can be fixed on the supporting member 68 and the rack 70e can be fixed on the base board 83.

In the aforesaid embodiment, a gear-belt driving mechanism is applied as the transmission device 70. It is not limited, and a screw-gear driving mechanism, a rack-gear driving mechanism and the like can be applied.

In the aforesaid embodiment, after the ring-shaped member 53 finished to move, on a display area including the first display area expressed the display design part 56, and the area erased the oil-pressure meter display area 62 and the oil-temperature meter display area 63, information of the vehicle other than information expressed, in FIG. 2, the remained amount of engine oil (OIL LEVEL), the remained amount of brake fluid (BRAKE FLUID), the remained amount of cooling water (COOLANT), the exhaust temperature (EXH-TEMP), the intake temperature (INT-TEMP) and the remained amount of washer fluid (WASHER) are expressed thereon. Instead of that, a navigating image of a navigation system or a monitor image of a back-guide monitor can be expressed.

In the second embodiment, an LCD is applied as the display unit. According to the present invention, any display unit, which can change expression by a computer program, for example, an organic EL, a plasma display and the like can be applied.

The ring-shaped member 53 is not limited to have a ring shape, and any shapes surrounding the display area, such as quadrangle, polygon or circular with partially straight line can be applied.

While, in the embodiment, the present invention is described with reference to the display apparatus 1, it is not limited thereto, and can be applied to a display apparatus, which make recognition to see from a front side of a display area by surrounding a partial area of the display area of a display unit with a circular-shaped member arranged to be movable linearly along the display area in front thereof, other than for a vehicle. Thus, various change and modifications can be made with the scope of the present invention.

What is claimed is:

1. A display apparatus comprising:
a display unit including a display area and a facing plate covering an outside area of the display area;
a ring-shaped member arranged in front of the display area so as to be movable linearly along the display area, and surrounding a partial area of the display area for making recognition of the partial area in a view from a front side of the display area;
an actuating device provided at a rear side of the display unit for moving the ring-shaped member; and
a supporting member for connecting the actuating device and two partial portions of the ring-shaped member spaced from each other in a direction along the display area and intersecting a linear moving direction of the ring-shaped member,
wherein the supporting member extends from the partial portions of the ring-shaped member toward an outer side of the ring-shaped member through an outside of the display unit until the actuating device,
wherein the facing plate includes an opening for exposing the display area, and a circumferential edge of the opening is arranged between the partial portions of the ring-shaped member and the supporting member along a front-rear direction of the display unit.

2. The display apparatus according to claim 1, wherein the display area displays various information of a vehicle, and a display design part for indicating measured values of driving condition of the vehicle from among the various information is surrounded as the partial area with the ring-shaped member.

* * * * *